(12) United States Patent
Swanson et al.

(10) Patent No.: US 11,909,950 B1
(45) Date of Patent: Feb. 20, 2024

(54) THREE-DIMENSIONAL (3D) SENSOR PERFORMANCE EVALUATION

(71) Applicant: Amazon Technologies, Inc., Seattle, WA (US)

(72) Inventors: Karl Bernard Swanson, Boston, MA (US); Gregory Cartagena, Boston, MA (US); Jing Ma, Salt Lake City, UT (US); Olugbenga Osibodu, Medford, MA (US); Albert William Saunders, IV, East Boston, MA (US); Stephen A. Caldara, Falmouth, MA (US); William Joseph Klein, Londonderry, NH (US); Dincer Bozkaya, Andover, MA (US); Sara Jean Woo, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 130 days.

(21) Appl. No.: 17/448,326

(22) Filed: Sep. 21, 2021

(51) Int. Cl.
| | |
|---|---|
| *G01C 3/00* | (2006.01) |
| *H04N 17/00* | (2006.01) |
| *G01S 17/894* | (2020.01) |
| *H04N 13/239* | (2018.01) |
| *G01S 7/497* | (2006.01) |
| *G01C 3/08* | (2006.01) |
| *G01S 17/42* | (2006.01) |
| *G01C 3/06* | (2006.01) |
| *G01S 17/48* | (2006.01) |
| *G01C 3/04* | (2006.01) |

(Continued)

(52) U.S. Cl.
CPC ............. *H04N 17/002* (2013.01); *G01C 3/00* (2013.01); *G01C 3/04* (2013.01); *G01C 3/06* (2013.01); *G01C 3/08* (2013.01); *G01C 3/20* (2013.01); *G01S 7/497* (2013.01); *G01S 17/42* (2013.01); *G01S 17/48* (2013.01); *G01S 17/894* (2020.01); *H04N 13/239* (2018.05); *G01S 7/40* (2013.01)

(58) Field of Classification Search
CPC ........ G01S 17/894; G01S 17/42; G01S 17/89; G01S 7/497; G01S 7/4972; G01S 7/4863; G01S 7/40; G01S 19/23; G01S 13/89; G01S 7/4808; G01S 17/88; G01S 17/08; G06T 2207/10028; G06T 7/521; G06T 7/80; G06T 2207/10024; G06T 7/55; G06T 2200/04; G06T 2207/30204; G06T 7/0004

See application file for complete search history.

(56) References Cited

U.S. PATENT DOCUMENTS

| | | | | |
|---|---|---|---|---|
| 9,558,563 | B1 * | 1/2017 | Kamarshi | ................ G06T 7/20 |
| 9,965,865 | B1 * | 5/2018 | Agrawal | ............ G06V 10/7747 |
| 10,217,195 | B1 * | 2/2019 | Agrawal | .................. G06T 7/11 |

(Continued)

*Primary Examiner* — Daniel Chang
(74) *Attorney, Agent, or Firm* — Eversheds Sutherland (US) LLP

(57) ABSTRACT

Systems and methods for evaluating the performance of three-dimensional (3D) sensors can include, for example, obtaining, via a 3D sensor in a testing apparatus, range information of a scene within a field-of-view (FOV) of the 3D sensor. The scene includes a plurality of targets disposed within the testing apparatus. Each of the plurality of targets is located at a different distance from the 3D sensor in the testing apparatus. A validation of the performance of the 3D sensor at the different distances is performed at a same point in time, based on the range information. An indication of a result of the validation is provided.

20 Claims, 14 Drawing Sheets

(51) Int. Cl.
*G01C 3/20* (2006.01)
*G01S 7/40* (2006.01)

(56) References Cited

U.S. PATENT DOCUMENTS

| | | | | |
|---|---|---|---|---|
| 10,258,259 | B1* | 4/2019 | Zets | A61B 5/7455 |
| 10,455,212 | B1* | 10/2019 | Konolige | H04N 13/282 |
| 10,867,275 | B1* | 12/2020 | Dholakia | G06V 20/52 |
| 10,902,623 | B1* | 1/2021 | Li | G01S 7/4816 |
| 10,937,183 | B2* | 3/2021 | Fernandez-Dorado | G06F 3/04883 |
| 11,195,290 | B2* | 12/2021 | Morozov | G01B 11/2513 |
| 11,556,182 | B2* | 1/2023 | Ahn | G06F 3/011 |
| 2011/0098886 | A1* | 4/2011 | Deng | B60W 50/0098 701/72 |
| 2011/0267626 | A1* | 11/2011 | Hung | G01B 11/14 356/625 |
| 2012/0201424 | A1* | 8/2012 | Masalkar | G06F 3/017 382/106 |
| 2013/0217983 | A1* | 8/2013 | Rebec | A61B 5/1459 600/316 |
| 2013/0242284 | A1* | 9/2013 | Zeng | G01S 17/931 356/4.01 |
| 2014/0207411 | A1* | 7/2014 | Laurent | G01B 11/26 702/158 |
| 2014/0232631 | A1* | 8/2014 | Fleischmann | G06F 18/28 345/156 |
| 2015/0161798 | A1* | 6/2015 | Venkataraman | H04N 13/229 348/47 |
| 2016/0142700 | A1* | 5/2016 | Grover | H04N 13/243 348/47 |
| 2017/0140550 | A1* | 5/2017 | Zhang | G06T 7/50 |
| 2017/0178333 | A1* | 6/2017 | Zhang | G06T 7/0004 |
| 2017/0223337 | A1* | 8/2017 | Sung | G01S 7/497 |
| 2017/0251143 | A1* | 8/2017 | Peruch | H04N 13/239 |
| 2018/0014003 | A1* | 1/2018 | Grover | H04N 13/243 |
| 2018/0247424 | A1* | 8/2018 | Bleyer | G01B 11/24 |
| 2018/0249143 | A1* | 8/2018 | Calpe Maravilla | G01S 7/4814 |
| 2019/0000564 | A1* | 1/2019 | Navab | H04N 13/254 |
| 2019/0011541 | A1* | 1/2019 | O'Keeffe | G01S 7/4817 |
| 2019/0072650 | A1* | 3/2019 | Tatipamula | G01S 7/4861 |
| 2019/0155302 | A1* | 5/2019 | Lukierski | G05D 1/0251 |
| 2019/0204421 | A1* | 7/2019 | Gurevich | B65D 90/48 |
| 2020/0111225 | A1* | 4/2020 | Chondro | G05D 1/0088 |
| 2020/0120299 | A1* | 4/2020 | Li | H04N 23/80 |
| 2020/0184684 | A1* | 6/2020 | Ma | G06T 7/174 |
| 2020/0209363 | A1* | 7/2020 | Sunil Kumar | G01S 7/497 |
| 2020/0410750 | A1* | 12/2020 | Huang | G01S 17/89 |
| 2021/0027492 | A1* | 1/2021 | Lovegrove | G06T 7/80 |
| 2021/0097147 | A1* | 4/2021 | DeVore | G06F 30/20 |
| 2021/0109205 | A1* | 4/2021 | Liao | G01S 7/481 |
| 2022/0016779 | A1* | 1/2022 | Wang | G06T 7/50 |
| 2022/0091170 | A1* | 3/2022 | Berry | G01S 13/931 |
| 2022/0130185 | A1* | 4/2022 | Morelli | H04N 7/185 |
| 2022/0155776 | A1* | 5/2022 | Qian | G05D 1/0011 |
| 2022/0171068 | A1* | 6/2022 | Hayman | G01S 17/95 |
| 2022/0206117 | A1* | 6/2022 | Qiu | G06T 7/20 |
| 2022/0291364 | A1* | 9/2022 | Sievers | G01S 17/931 |

* cited by examiner

US 11,909,950 B1

THREE-DIMENSIONAL (3D) SENSOR PERFORMANCE EVALUATION

BACKGROUND

The present disclosure generally relates to three-dimensional (3D) sensing technology, and more specifically, to techniques and apparatus for evaluating and validating the performance of 3D sensors.

3D sensor technology (or 3D sensing technology) is increasingly being used in a variety of applications, including, for example, industrial and factory automation, access control, imaging and navigation, obstacle detection, autonomous robots, augmented reality (AR), virtual reality (VR), etc. In these applications, 3D sensors can be used to determine range or depth information about a target(s) in a scene. The range information can be used to generate 3D images (or maps) of the target(s). Some examples of 3D sensor technology include stereoscopic (or stereo) vision, time-of-flight, light detection and ranging (LIDAR), 3D radar, etc. The performance of a 3D sensor may be based on the accuracy of the 3D sensor to measure depth within a scene. This accuracy, in turn, may be based on the calibration of parameter(s) of the 3D sensor.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1:
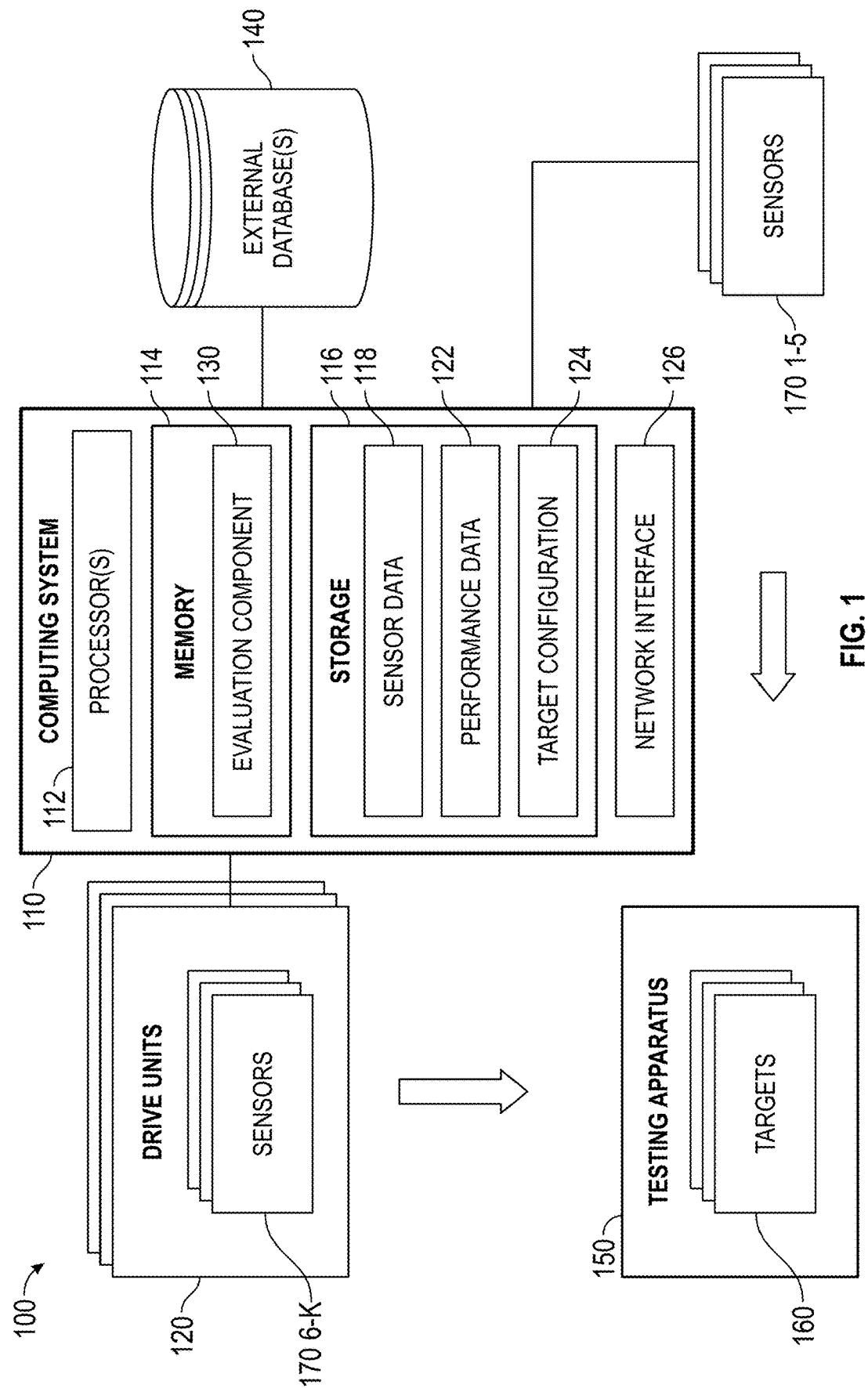
FIG. 1 is a block diagram of a system for evaluating and validating the performance of 3D sensors, according to one embodiment.

Embodiments described herein provide techniques and apparatus for evaluating (or characterizing) and validating the performance of 3D sensors. For example, the performance of a 3D sensor can be based on one or more depth metrics, which can include, but are not limited to, depth accuracy, fill ratio, planar angle deviations, etc. In many cases, the performance of a 3D sensor can be affected by multiple error sources, including alignment and calibration errors of 3D sensor parameter(s).

In the case of a stereo camera, which includes two imaging sensors (or cameras or imagers) separated by a baseline, the depth accuracy of the stereo camera is generally a function of intrinsic parameters (e.g., the calibration of each imaging camera) and extrinsic parameters (e.g., the calibration of the two imaging cameras with respect to each other). When the calibration parameters of the stereo camera are improperly set (or have fallen out of calibration), the points detected by the stereo camera can be skewed in one or more planes (e.g., X-Y plane, X-Z plane, Y-Z plane). This skew, in turn, can lead to inaccuracies in the detection of objects.

Embodiments described herein provide a testing apparatus (or fixture or structure), which can be used to evaluate (or characterize) and validate the performance of a 3D sensor. The 3D sensor can include a visual depth sensor (e.g., stereo camera, time of flight camera, etc.) or a non-visual depth sensor (e.g., 3D radar, LIDAR, etc.). The testing apparatus is generally a single unit (or structure) that has a minimum footprint (e.g., the testing apparatus is in a confined area). The testing apparatus can include multiple targets (or panels), where each target is placed at a different distance from a testing position located at an end of the testing apparatus. The testing apparatus can be configured to fill the entire field of view (FOV) of a 3D sensor (placed in the testing position) with the targets at the different distances. For example, one or more of the targets can include a window portion cut out from the respective target. Each window portion of a given target may allow the 3D sensor to have visibility to one or more other (incrementally spaced) targets through the window portion. In this manner, the 3D sensor's FOV can be filled (or occluded) with at least one portion of each target at a different distance.

Configuring multiple targets at different distances within the same testing apparatus enables the testing apparatus to have a minimum footprint and allows for testing the performance of a 3D sensor over multiple distances at the same time. For example, the testing apparatus allows for determining the performance of a 3D sensor at various depths according to one or more depth metrics. The depth metrics can include, for example, depth accuracy (also known as absolute accuracy), fill ratio (also known as valid pixel percentage), planar angle deviations (e.g., average angle of a plane, such as X-Y/Y-Z/X-Z plane, deviating from a predefined (ideal or perfect-world) plane), standard deviation of a depth value, etc. The depth metrics may be determined for each target (at a different distance) within the testing apparatus at the same time (e.g., based on a single image captured by the 3D sensor, or more generally, scene information captured by the 3D sensor at a point in time).

The testing apparatus described herein can be used to evaluate the performance of a 3D sensor(s) at any point during the lifecycle of the 3D sensor. In some embodiments, the testing apparatus can be used to perform depth testing and validation of stand-alone 3D sensors (e.g., the 3D sensors may be not be attached to another device or structure). For example, a manufacturer of 3D sensors can use the testing apparatus to evaluate and validate the performance of manufactured 3D sensors. In another example, a facility (or user) that receives a set of 3D sensors (from a manufacturer) can use the testing apparatus to evaluate and validate the performance of the 3D sensors, prior to using the 3D sensors in a given application.

In some embodiments, the testing apparatus can be used to support regression testing of firmware updates for 3D sensors. For example, a 3D sensor can receive firmware updates (over the course of its operation/lifecycle) that control the calibration parameters of the 3D sensor. In these embodiments, the testing apparatus can be used to evaluate and validate the performance of the 3D sensors, after a firmware update, e.g., for regression testing.

In some embodiments, the testing apparatus can be used to perform depth testing and validation of 3D sensors on a drive unit. For example, a drive unit may be a self-powered autonomous robotic device that travels on the floor of an environment (e.g., facility, such as a warehouse or fulfillment center). The drive unit can be equipped with one or more 3D sensors (e.g., stereo camera) to perform navigation and/or obstacle detection. For example, based on the information from the 3D sensor(s), the drive unit can adjust its path to avoid colliding with objects. In these embodiments, the drive unit can be configured to transition (or travel) to the testing apparatus to evaluate and validate the performance of the 3D sensors. The testing apparatus, for example, may be located within a predefined region of a structured environment in which the drive unit operates. In another example, the testing apparatus may be located within a predefined region of an unstructured environment in which the drive unit operates. The drive unit may transition to the testing apparatus upon occurrence of a predetermined condition (e.g., a predefined event, a predefined amount of time has elapsed, a receipt of a command, etc.).

Note that while many of the following embodiments describe using the testing apparatus described herein to evaluate and validate the performance of stereo cameras, embodiments described herein are not limited to such and can be used to evaluate the performance of other types of 3D sensors, such as time-of-flight sensors, LIDAR sensors, 3D radar, etc.

FIG. 1 is a block diagram of an example system 100 for evaluating and validating the performance of 3D sensors, according to one embodiment. The system 100 can be deployed in a variety of different environments, including, for example, indoor environments, outdoor environments, a facility (e.g., warehouse, fulfillment center, storehouse, etc.), manufacturing lab, etc. The system 100 includes a computing system 110, one or more drive units 120, one or more external databases 140, a testing apparatus 150, and one or more sensors 170 1-K. The computing system 110 may be communicatively coupled to the drive unit(s) 120, the sensor(s) 170, and the external database(s) 140.

The sensors 170 are generally representative of 3D sensors. The 3D sensors can include visual (depth) sensors (e.g., stereo cameras, time of flight cameras, etc.), non-visual (depth) sensors (e.g., 3D radar, LIDAR sensors, etc.), or combinations of visual and non-visual (depth) sensors. In one particular embodiment, the sensors 170 include stereo cameras. In some embodiments, one or more of the sensors 170 (e.g., sensors 170 1-5) may be standalone sensors that are not physically attached to (or integrated with) another device or structure. In some embodiments, one or more of the sensors 170 may be located on (or attached to, or integrated with) another device or structure. As shown in FIG. 1, for example, one or more of the sensors 170 (e.g., sensors 170 6-K) are located on the drive units 120. Although not shown in FIG. 1, the sensor(s) 170 can include a network interface that allows for communicating with other components (e.g., computing system 110) in the system 100 via a data communications network (e.g., wide area network (WAN), local area network (LAN), wireless LAN, personal area network (PAN), a cellular network, Internet, etc.).

The drive units 120 (also referred to as autonomous surface vehicles, autonomous robotic vehicles, mobile drive units, etc.) may be configured to autonomously travel within an environment using the sensors 170. For example, a drive unit 120 may use the sensors 170 to navigate and/or detect obstacles within the environment. In some embodiments, the drive units 120 may be configured to operate in a structured field. In these embodiments, the drive unit 120 may be equipped with a camera (or other sensor) configured to detect fiducials (or fiducial markers) on the floor of the environment. In other embodiments, the drive units 120 may be configured to operate in an unstructured field. In these embodiments, the drive unit 120 may be equipped with one or more additional types of sensors for navigating through the unstructured field and may not be equipped with a sensor for detecting fiducials. More details describing an example drive unit that can be used within a structured field and an unstructured field can be found in U.S. patent application Ser. No. 17/361,843, filed Jun. 29, 2021, which is expressly incorporated by reference herein in its entirety.

The testing apparatus 150 (also referred to as a testing fixture or testing structure) can be used to evaluate and validate the performance of a sensor 170 over multiple distances. For example, the testing apparatus 150 includes multiple incrementally spaced targets 160 (also referred to as panels). That is, each target 160 can be located at a different distance from a testing position located at an end of the testing apparatus, where a sensor 170 can be positioned or located. Additionally, in some embodiments, one or more of the targets 160 can include a window portion (cut out from the respective target) to allow visibility to at least one other incrementally spaced target at a different distance. The window portions may be configured such that each target 160 covers (or fills or occludes) at least a portion of the FOV of the sensor 170 (placed in front of the testing apparatus 150). That is, the entire FOV of the sensor 170 can be covered by at least one portion of each target 160 within the testing apparatus 150. By configuring the targets 160 within the testing apparatus 150 in this manner, embodiments can validate the entire FOV of a given sensor 170 over multiple distances (or depths) at the same time, as opposed to validating a single distance (using a different target) at a time.

The computing system 110 is generally configured to perform an evaluation and validation of the performance of the sensor(s) 170, based on sensor data captured by the sensor(s) 170 using the targets 160 in the testing apparatus 150. The computing system 110 is representative of a variety of computing devices (or systems), including a laptop computer, a desktop computer, mobile computer (e.g., a tablet or a smartphone), a server, etc. In one embodiment, one or more components of the computing system 110 may be distributed across multiple computing systems in a cloud computing environment.

The computing system 110 includes processor(s) 112, a memory 114 (e.g., volatile, non-volatile, etc.), a storage 116, and a network interface 126. The storage 116 may be a combination of a fixed and/or removable storage, such as fixed disc drives, removable memory cards, optical storage, network attached storage (NAS), or storage-area-network (SAN). The network interface 126 may be any type of network communications interface that allows the computing system 110 to communicate with other computing systems and/or components in the system 100 via a data communications network (e.g., WAN, LAN, wireless LAN, PAN, a cellular network, Internet, etc.).

The memory 114 includes an evaluation component 130, which can include software components, hardware components, or a combination thereof. The evaluation component 130 is configured to perform one or more techniques described herein for evaluating and validating the performance of a 3D sensor, such as the sensor 170. The evaluation component 130 is described in more detail below. The storage 116 includes sensor data 118, performance data 122, and a target configuration 124. In some embodiments, at least some of the information within the storage 116 can be stored in an external database(s) 140.

The target configuration 124 includes configuration information of the targets 160 within the testing apparatus 150. Such configuration information can include, for example, the size and dimensions of each target 160, a type of pattern (if any) used for each target 160, the location and distance (from the testing position) at which each target 160 is placed within the testing apparatus, etc. Note that while a single testing apparatus 150 is depicted in FIG. 1, in some embodiments, the system 100 can include multiple testing apparatus 150. In these embodiments, each of the multiple testing apparatus can include a different configuration of targets 160, for example, for testing different types of sensors, different FOVs of sensors, etc. In embodiments where the system 100 includes multiple testing apparatus 150, the target configuration 124 can include configuration information associated with the targets within each testing apparatus 150.

The sensor data 118 generally includes scene information captured by each of the sensor(s) 170 of the targets 160 within the testing apparatus 150. In one embodiment, the sensor data 118 can include range information, indicating the depth (or distance) to various objects in the scene (e.g., the FOV of the sensor 170). In one embodiment, the range information may be in the form of a depth map (e.g., point cloud data). In one particular embodiment, the sensor data 118 can include, for each sensor 170, a single image of the scene captured by the sensor 170.

The performance data 122 generally includes one or more depth metric values and other statistical information indicative of the performance of the sensor 170. Examples of the depth metrics can include, but are not limited to, depth accuracy, fill ratio, planar angle deviations, standard deviation of depth, etc. In one embodiment, the evaluation component 130 can generate the performance data 122 for each sensor 170 using the target configuration 124 and the sensor data 118 for the respective sensor 170. The performance data 122 can include, for each sensor 170, the depth metric values at each of the different distances (corresponding to the different targets 160) within the testing apparatus 150.

In some embodiments, the performance data 122 can include information indicating one or more planar regions for each of the targets 160. For example, the evaluation component 130 can determine the one or more planar regions from the sensor data 118. In these embodiments, the performance data 122 can include, for each sensor 170, depth metric values for the one or more planar regions at each of the different distances. For example, the evaluation component 130 can perform a statistical analysis on each planar region (at each distance) to determine the depth metric(s) for that planar region.

In some embodiments, the evaluation component 130 can perform a validation of the performance of a sensor 170, based on the performance data 122. For example, the evaluation component 130 can determine, based on the performance data 122, whether a sensor 170 has passed validation (e.g., the one or more depth metrics for the sensor 170 satisfy a predetermined condition(s)). The evaluation component 130 can include an indication of whether the validation of a sensor 170 has "passed" or "failed" in the performance data 122. The evaluation component 130 may store the performance data 122 in one or more formats, depending on the type of data. For example, the formats can include, but are not limited to, text files (e.g., comma-separated values (CSV) files, TXT files, hypertext markup language (HTML) files, etc.), image files (e.g., portable network graphic (PNG) files), etc.

Figure 2A:
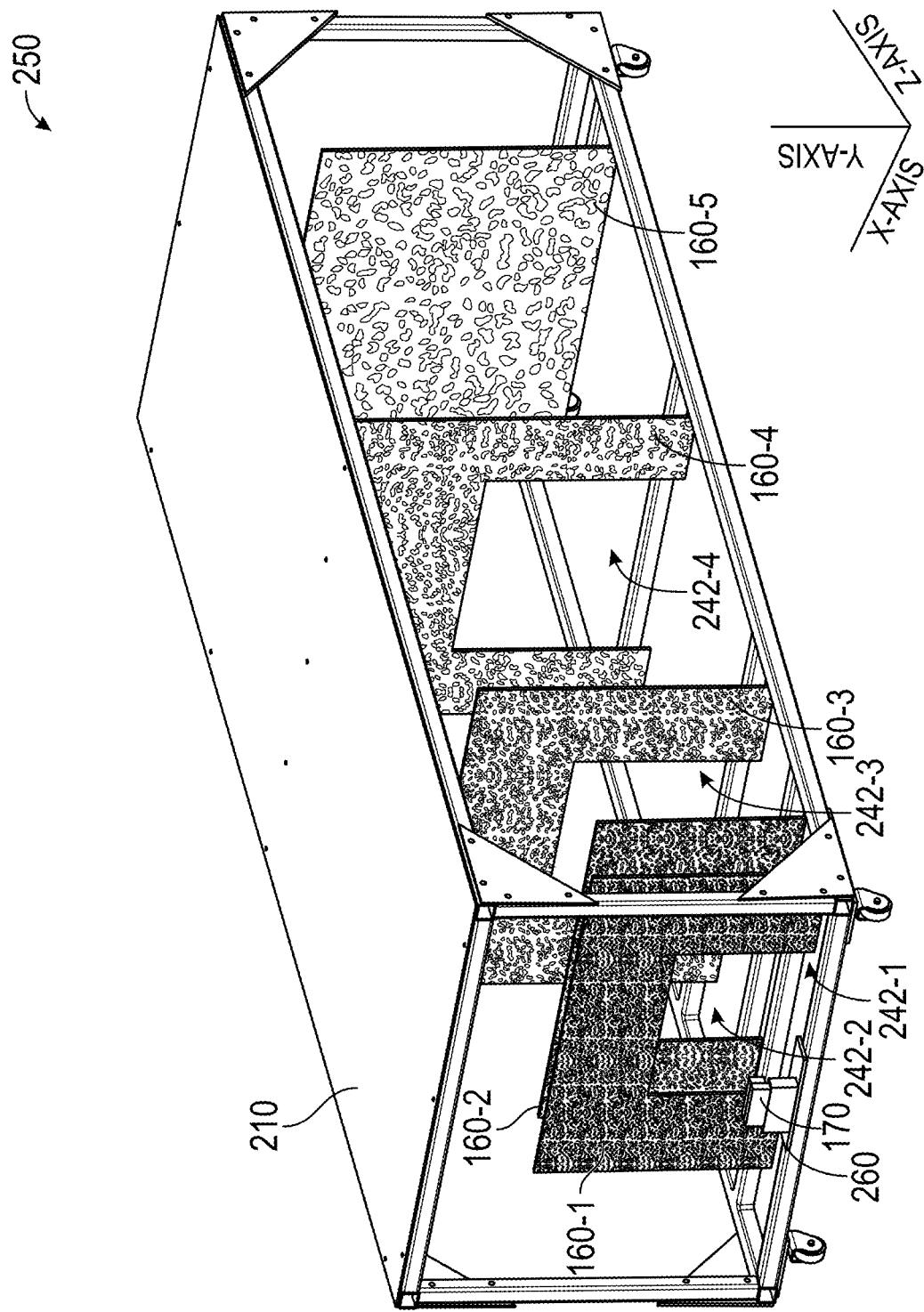
FIG. 2A illustrates a perspective view of a testing apparatus, according to one embodiment.
Figure 2B:
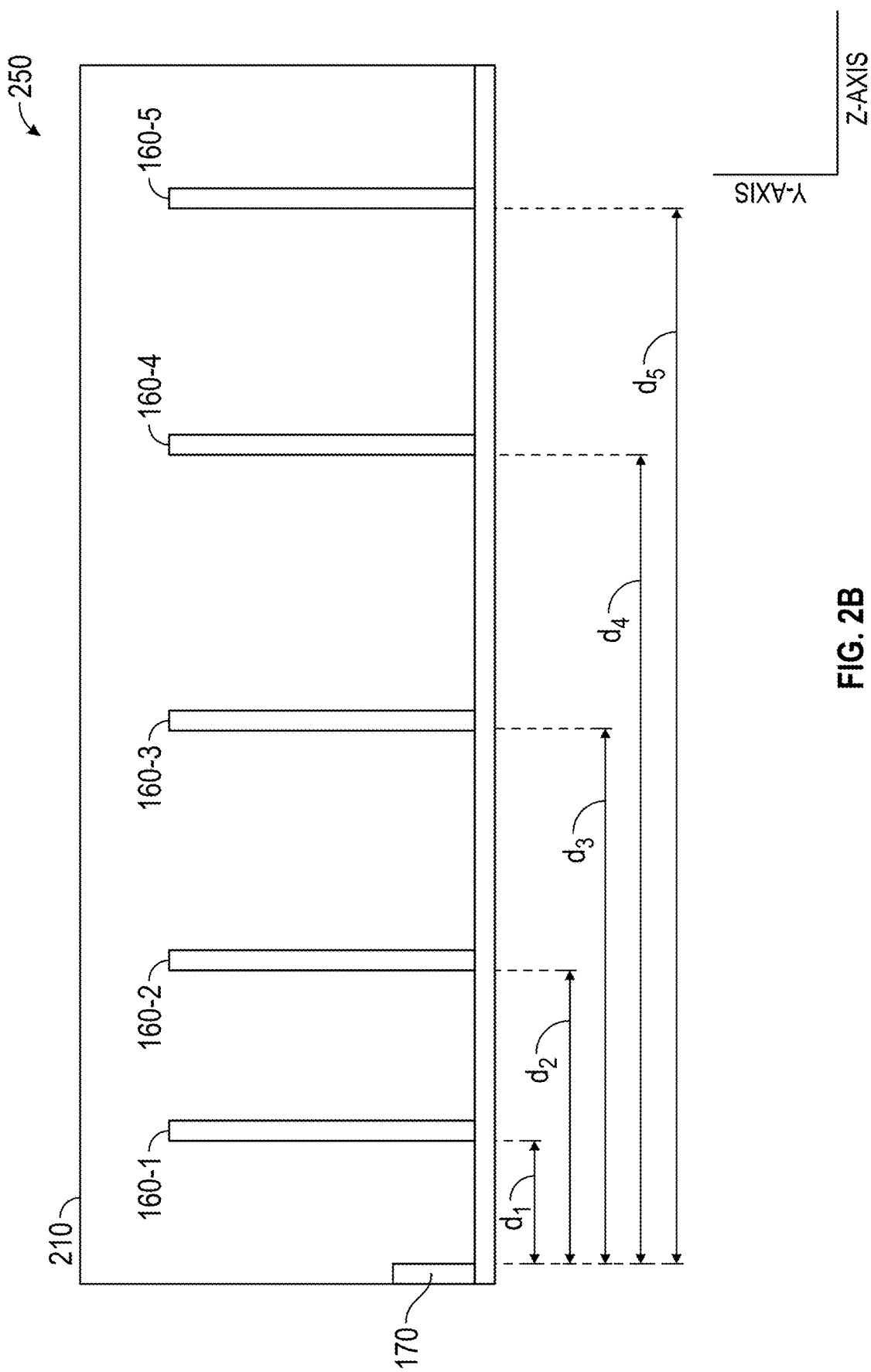
FIG. 2B illustrates a side view of a testing apparatus, according to one embodiment.
Figure 2C:
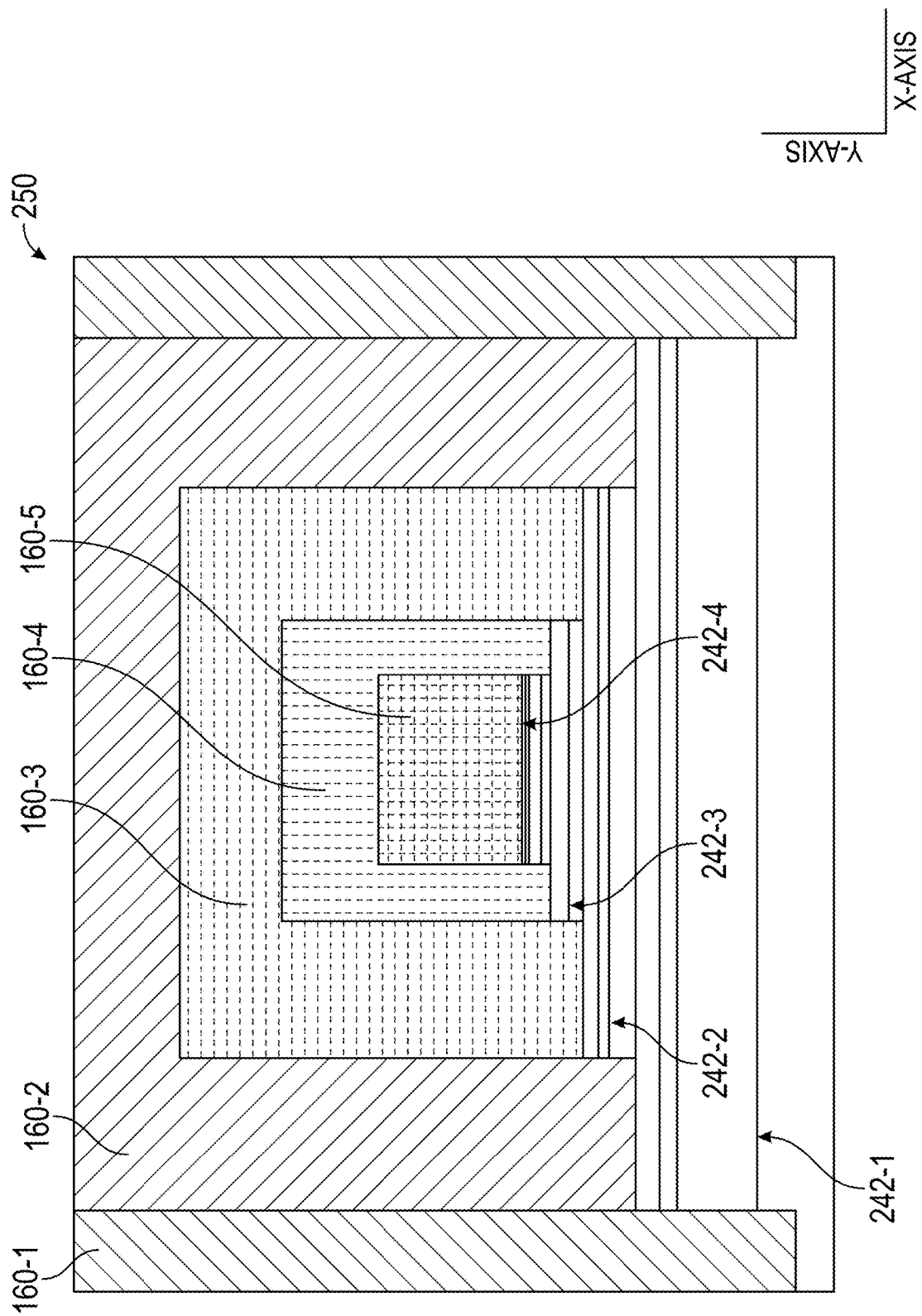
FIG. 2C illustrates a front view of a testing apparatus, according to one embodiment.

FIGS. 2A-2C illustrate different views of a testing apparatus 250, according to one embodiment. In particular, FIG. 2A is a perspective view of the testing apparatus 250, FIG. 2B is a side view of the testing apparatus 250, and FIG. 2C is a front view of the testing apparatus 250 (from the perspective of a sensor 170), according to one embodiment. The testing apparatus 250 is one example of the testing apparatus 150 illustrated in FIG. 1.

In this particular embodiment, the testing apparatus 250 includes targets 160 1-5. The targets 160 1-5 are incrementally spaced from the sensor 170, which is located in a testing position 260 at an end of the testing apparatus 250. For example, target 160-1 is located a distance $d_1$ from the sensor 170, target 160-2 is located a distance $d_2$ from the sensor 170, target 160-3 is located a distance $d_3$ from the sensor 170, target 160-4 is located a distance $d_4$ from the sensor 170, and target 160-5 is located a distance $d_5$ from the sensor 170, where $d_1 < d_2 < d_3 < d_4 < d_5$. In one particular embodiment, $d_1$ is approximately 300 millimeters (mm), $d_2$ is approximately 500 mm, $d_3$ is approximately 1000 mm, $d_4$ is approximately 2000 mm, and $d_5$ is approximately 3000 mm. Note, however, that these are merely examples of distances $d_1$-$d_5$ that can be used for the targets 160 1-5, and that the testing apparatus can be configured with targets placed at different distances.

In some embodiments, the sensor 170 may be disposed on a mount located within the testing position 260. The mount (or other type of structure or fixture) may be used to align the sensor 170 with respect to the targets 160 1-5, such that a depth origin reference of the sensor 170 is aligned with a center of the testing apparatus 250 (e.g., center of the target 160-5). For example, assuming the sensor 170 is a stereo camera with two imaging sensors (also referred to as imagers), one of the two imaging sensors may be used as the main imaging sensor of the stereo camera. In this example, the depth origin reference of the stereo camera may refer to the center (e.g., X-Y center) of the main imaging sensor.

The targets 160 1-5 are vertical planar structures (or fixtures) (e.g., in the Y-Z plane), which may be formed of any suitable materials (e.g., metal, plastic, wood, etc.). In this embodiment, as shown in FIGS. 2A and 2C, the targets 160 1-5 are textured with different patterns (e.g., for passive visual depth sensors, such as a passive stereo camera). In some embodiments, the patterns on the targets 160 1-5 may be scaled with respect to distance. For example, the pattern on target 160-1 may have a scale factor of 1×, the pattern on target 160-2 may have a scale factor of 2×, the pattern on target 160-3 may have a scale factor of 3×, and so on. Note, however, that this is merely an example of the scale factors that can be used and that other scale factors can be used.

While not shown in FIGS. 2A-2C, in other embodiments, the targets 160 1-5 may be untextured (e.g., for active visual depth sensors, such as an active stereo camera). In embodiments where the targets 160 1-5 are untextured, the sensor 170 can use a projector(s) to project a different structured light pattern onto each of the targets 160 1-5.

The targets 160 1-5 may have a configuration (e.g., size, position, dimensions, texture, window portion(s), etc.), such that the entire FOV of the sensor 170 is filled (or occluded) with at least one portion of each target 160 1-5. For example, as shown in FIGS. 2A and 2C, the target 160-1 includes a window portion 242-1 cut out (or removed) from the target 160-1, the target 160-2 includes a window portion 242-2 cut out from the target 160-2, the target 160-3 includes a window portion 242-3 cut out from the target 160-3, and the target 160-4 includes a window portion 242-4 cut out from the target 160-4. Each window portion 242 of a given target 160 may allow the sensor 170 to have visibility to at least a portion of at least one other target 160 within the same testing apparatus.

Using FIG. 2C as a reference example, the sensor 170 may have visibility to at least a portion of each of the targets 160 2-5 through the window portion 242-1 of target 160-1, the sensor 170 may visibility to at least a portion of each of the targets 160 3-5 through the window portion 242-2 of target 160-2, the sensor 170 may have visibility to at least a portion of each of the targets 160 4-5 through the window portion 242-3 of target 160-3, and the sensor 170 may have visibility to at least a portion of the target 160-5 through the window portion 242-4 of target 160-4. In this manner, the targets 160 1-5 can be presented at different distances to the sensor 170 within the same scene (e.g., within the sensor's FOV), and each target 160 1-5 can obstruct a sufficient amount of the sensor's FOV to allow for depth testing (e.g., determining at least one depth metric) at any given point.

In some cases, the testing apparatus 250 can be susceptible to inconsistent lighting conditions (e.g., at different times of day) that can cause variation in the sensor performance data. To address this, in some embodiments, the testing apparatus 250 can be configured with a light diffuser (also referred to as a light diffusing panel) to mitigate glare from various lighting conditions. As shown in FIGS. 2A and 2B, the testing apparatus 250 includes a light diffuser 210, which is disposed above the targets 160 1-5. The light diffuser 210 is generally configured to reduce glare on the targets 160 1-5 (e.g., from ambient light) and to provide light uniformity across the targets 160 1-5. The light diffuser 210 may be formed from any suitable materials, including, e.g., plastic, paper, glass, fabric, etc.

Note that while the testing apparatus 250 is depicted with five targets 160 1-5, in other embodiments the testing apparatus 250 may have a different configuration and/or form factor. For example, in some embodiments, the testing apparatus 250 can include a fewer or greater number of targets 160. Additionally or alternatively, in some embodiments, the testing apparatus 250 may not be configured with a light diffuser 210. In general, the testing apparatus 250 can have any suitable configuration and/or form factor consistent with the functionality described herein for enabling the validation of the performance of a sensor 170 across its entire FOV over multiple distances at the same time using a single testing apparatus.

Figure 3A:
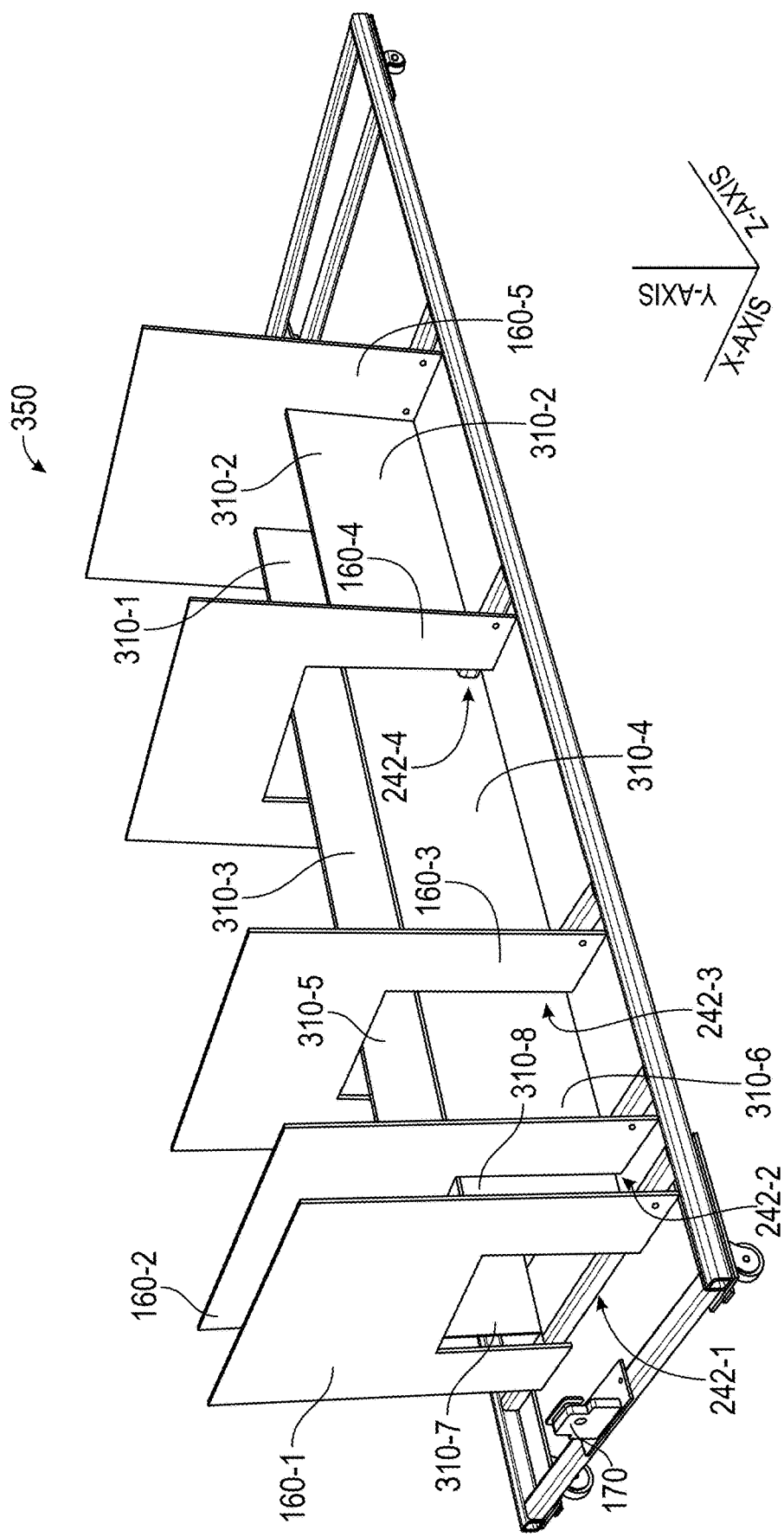
FIG. 3A illustrates a perspective view of another testing apparatus, according to one embodiment.
Figure 3B:
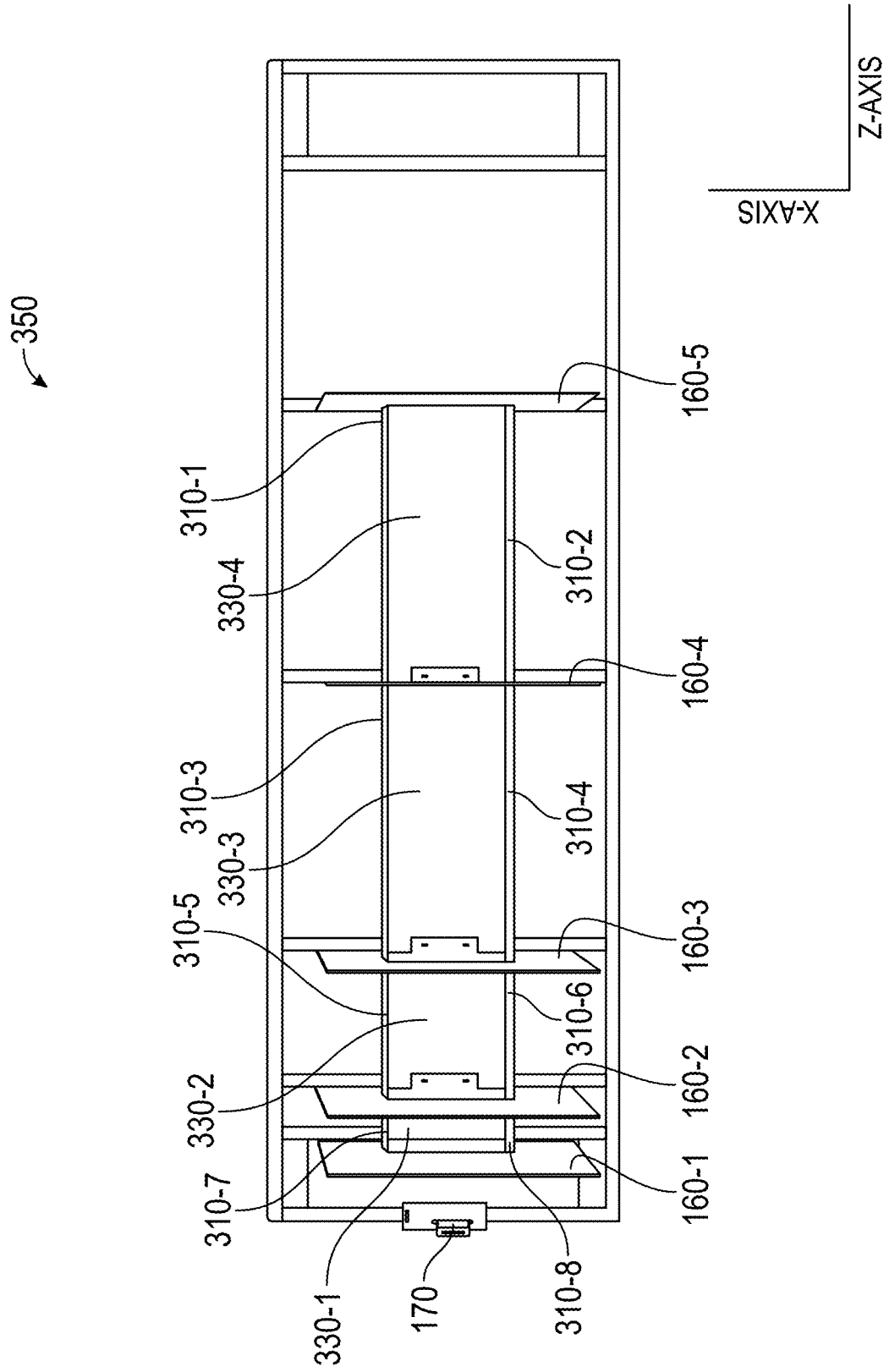
FIG. 3B illustrates a top view of another testing apparatus, according to one embodiment.

In some embodiments, the testing apparatus 150 depicted in FIG. 1 can be configured with targets that allow for evaluating and validating the performance of a sensor 170 in multiple different planes, e.g., horizontal planes, side planes, vertical planes, etc. FIGS. 3A-3B illustrate different views of a testing apparatus 350, according to one embodiment. In particular, FIG. 3A is a perspective view of the testing apparatus 350 and FIG. 3B is a top view of the testing apparatus 350, according to one embodiment. The testing apparatus 350 is one example of the testing apparatus 150 illustrated in FIG. 1.

Compared to the testing apparatus 250 depicted in FIGS. 2A-2C, the testing apparatus 350 includes (horizontal) targets (or panels) 330 1-4 located on the bottom of the testing apparatus 350 (e.g., in the X-Z plane) and (side) targets (or panels) 310 1-8 (e.g., in the Y-Z plane). The targets 310 1-8 may be disposed within the window portions 242 1-4. In some embodiments, the targets 330 1-4 and/or the targets 310 1-8 may be textured (e.g., assuming the sensor 170 is a passive visual depth sensor). In embodiments where the targets 330 1-4 and/or targets 310 1-8 are textured, the patterns used on the respective targets may scale with distance. In some embodiments, the targets 330 1-4 and/or the targets 310 1-8 may be untextured (e.g., assuming the sensor 170 is an active visual depth sensor).

By configuring the testing apparatus 350 with targets on the side and bottom of the testing apparatus 350, embodiments can enable the evaluation of the performance of the sensor 170 in the X-Z and Y-Z planes. For example, the targets 310 1-8 can be used to validate that the angle of the Y-Z plane detected by the sensor 170 is not skewed from an ideal Y-Z planar angle. In general, embodiments herein can determine any depth metric in the X-Y plane (e.g., using the targets 160), the X-Z plane (e.g., using the targets 330), and/or the Y-Z plane (e.g., using the targets 310). Note that, in some cases, the targets 310-1, 310-3, 310-5, and 310-7 may be configured as a single side target with four different portions (or sections). Similarly, in some cases, the targets 310-2, 310-4, 310-6, and 310-8 may be configured as a single side target with four different portions (or sections). Similarly, in some cases, the targets 330 1-4 may be configured as a single horizontal target with four different portions (or sections).

Figure 4:
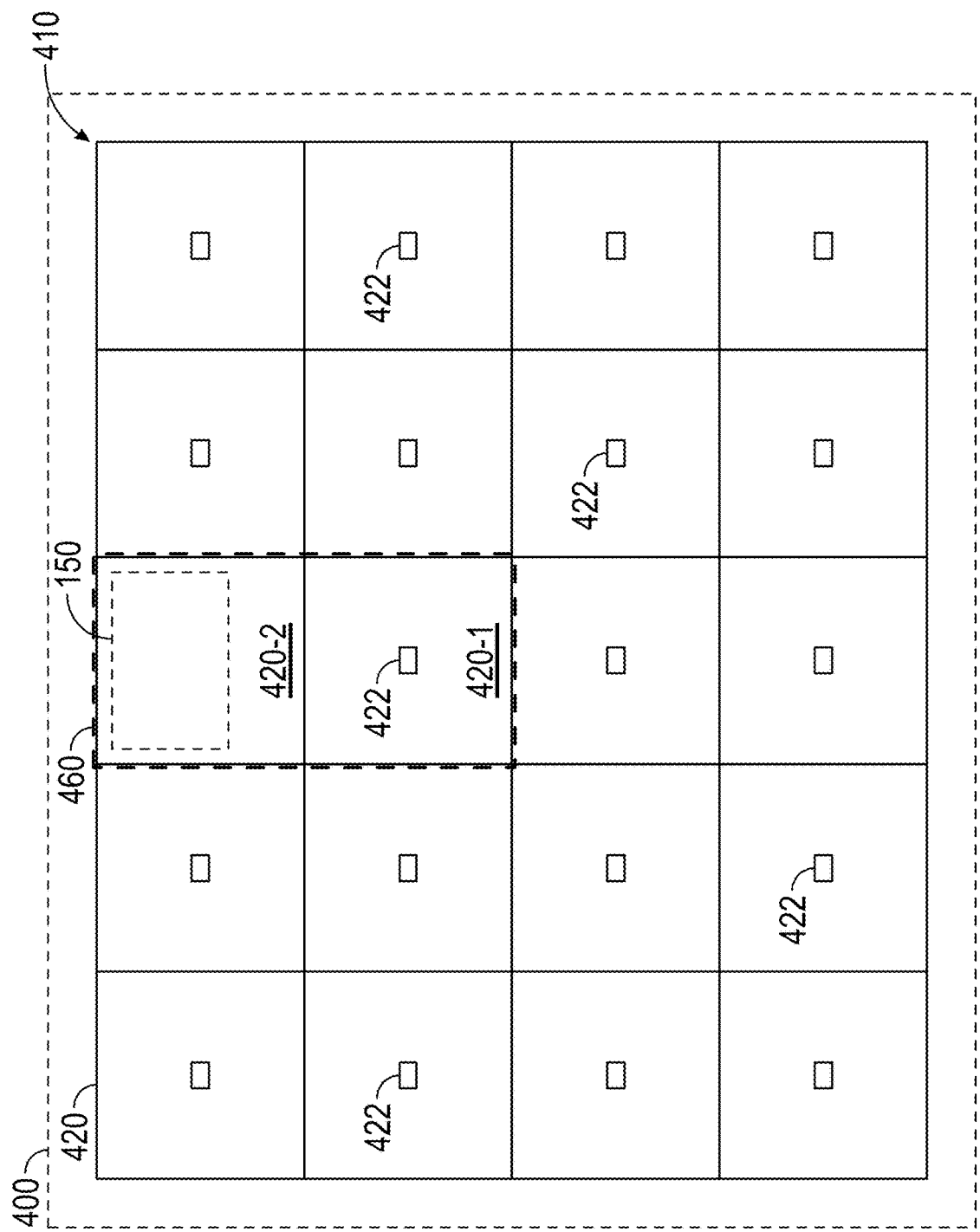
FIG. 4 illustrates a top view of a testing apparatus within a structured field of an environment, according to one embodiment.

As noted, in some embodiments, the testing apparatus 150 can be used to evaluate and validate the performance of sensors 170 on a drive unit 120. For example, the testing apparatus 150 can be disposed in a predefined area within an environment (e.g., structured environment, unstructured environment), and the drive units 120 can autonomously transition to the testing apparatus 150 within the predefined area to perform the performance evaluation and validation. FIG. 4 illustrates an example of a testing apparatus 150 disposed within a structured field 410 of an environment 400, according to one embodiment.

Here, the structured field 410 includes a gird of multiple cells 420 (also referred to as cell locations), each having a predefined set of dimensions. Each cell 420 may include a fiducial marker 422 (e.g., placed on the floor), which provides navigational references for the drive unit 120. While the structured field 410 is depicted as a grid of "square" cells, note that the structured field 410 can have another arrangement of cells. In general, each cell 420 can have other dimensions and/or a different geometry.

The testing apparatus 150 may be located in a predefined area 460 (or location) within the environment 400. Here, for example, the testing apparatus 150 is located within the structured field 410. In some embodiments, the structured field 410 may be externally bounded to prevent or limit access by human operator(s). As shown, the predefined area 460 is defined over two adjacent cells 420-1, 420-2. The cell 420-1 of the predefined area 460 includes a fiducial marker 422, which can be used to align the drive unit 120 with respect to the cell 420-2 of the predefined area 460.

The cell 420-2 of the predefined area 460 includes the testing apparatus 150, which the drive unit 120 can use to evaluate and validate the performance of the sensor(s) 170 located on the drive unit 120. In one embodiment, the drive unit 120 may approach the predefined area 460 and use the fiducial 422 (e.g., via a down facing sensor) to align itself within the cell 420-1 (e.g., adjust a position and/or orientation of the drive unit 120 relative to a position and/or orientation of the fiducial). The drive unit 120 may align itself within the cell 420-1, such that the drive unit 120 is forward facing with respect to the cell 420-2 and the testing apparatus 150 (within the cell 420-2) is within the FOV of the sensor(s) 170 of the drive unit 120. In some embodiments, the drive unit 120 may determine (via the (down facing) sensor) its positional and/or angular error relative to the fiducial 422, and may adjust (e.g., via a controller) its position relative to the fiducial 422, based on the positional and/or angular error information.

Figure 5:
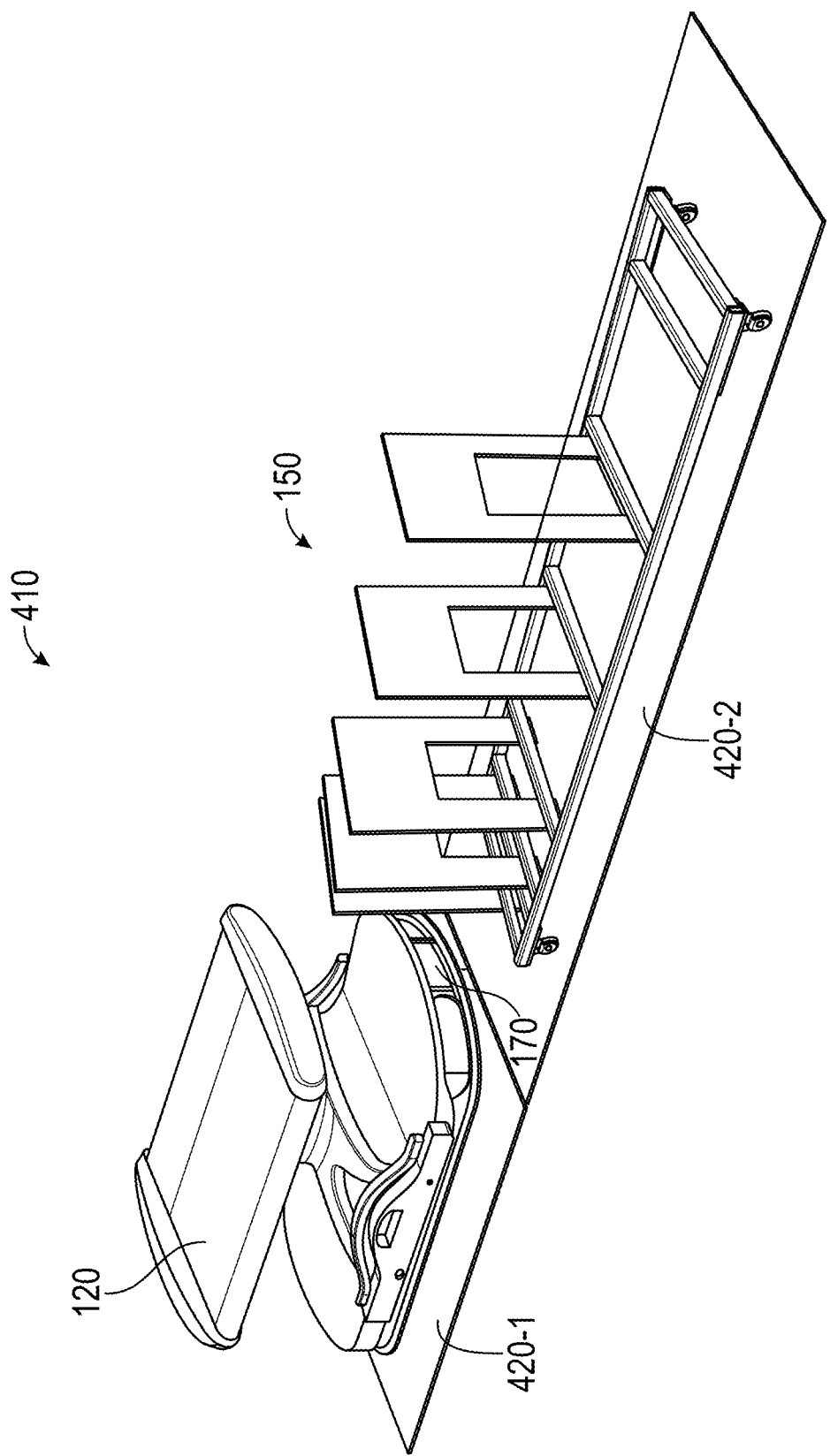
FIG. 5 illustrates a perspective view of a drive unit using a testing apparatus, according to one embodiment.

In one embodiment, the drive unit 120 may continually adjust its position and/or orientation until its positional and/or angular error relative to the fiducial 422 is below a predetermined threshold(s). In another embodiment, the drive unit 120 may determine (via the (down facing) sensor) its positional and/or angular error relative to the fiducial 422, and may perform the sensor performance evaluation and validation based in part on the error information. For example, the drive unit 120 may use the error information to compensate (or adjust) the values of one or more depth metrics using the testing apparatus 150. FIG. 5 illustrates a reference example of a drive unit 120 aligned with respect to a testing apparatus 150 within an environment 400, such as a structured field 410. More details describing how a drive unit can use fiducials to approach and align itself with respect to a structure within a structured field can be found in U.S. patent application Ser. No. 17/361,843, filed Jun. 29, 2021, which is expressly incorporated by reference herein.

Figure 6:
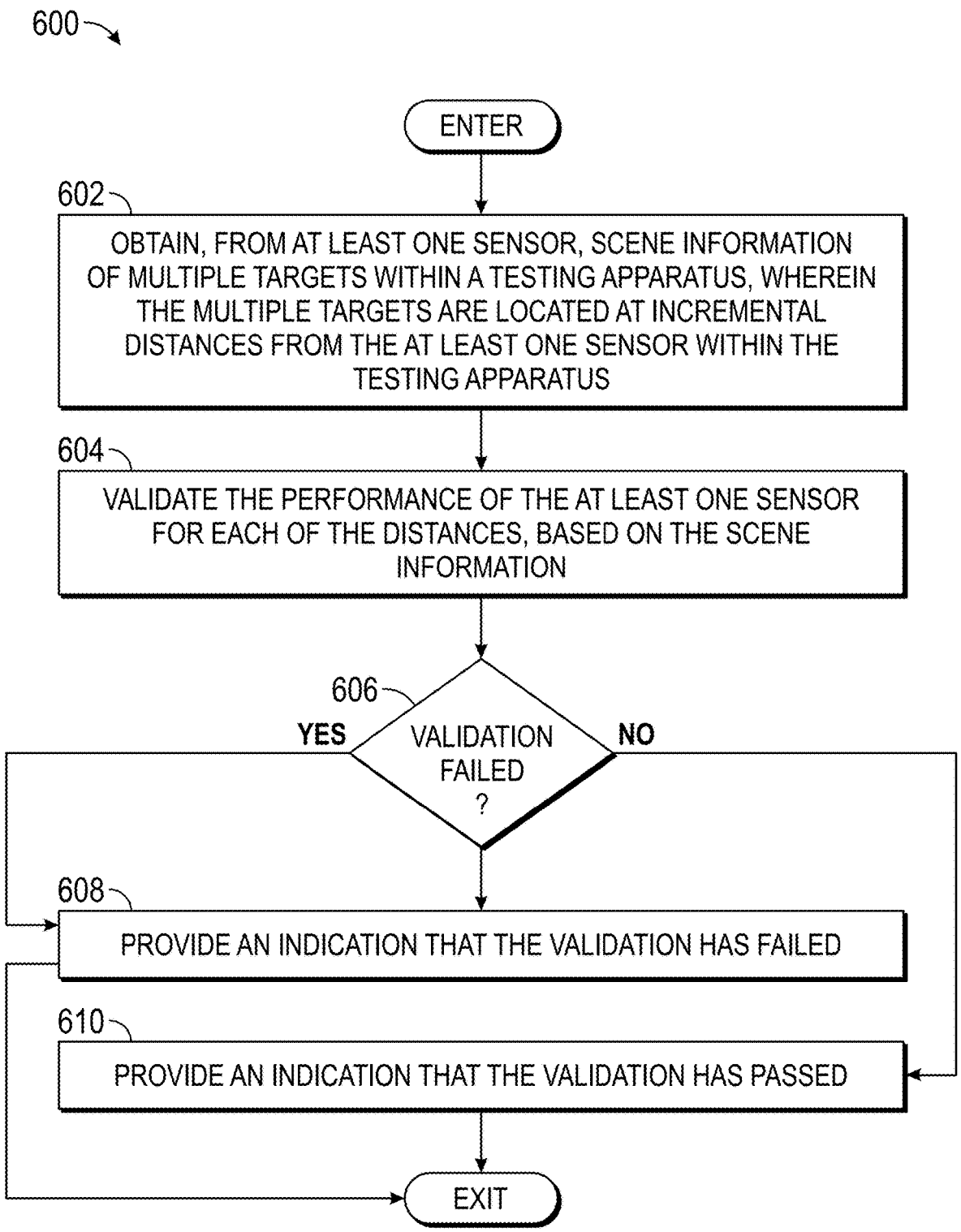
FIG. 6 is a flowchart of a method for evaluating and validating the performance of a sensor, according to one embodiment.

FIG. 6 is a flowchart of a method 600 for evaluating and validating the performance of a sensor 170, according to one embodiment. The method 600 may be performed by one or more components of a computing system (e.g., computing system 110). In one particular embodiment, the method 600 is performed by the evaluation component 130.

Method 600 enters at block 602, where the computing system obtains, from at least one sensor (e.g., sensor 170) scene information (e.g., sensor data 118) of multiple targets (e.g., targets 160) within a testing apparatus (e.g., testing apparatus 150). The multiple targets are located at incremental distances from the at least one sensor within the testing apparatus.

At block 604, the computing system validates the performance of the at least one sensor for each of the distances, based on the scene information. In one embodiment, the computing system may calculate one or more depth metrics (e.g., fill ratio, depth accuracy, planar angle deviations, depth standard deviation, etc.) for each of the distances, based on the scene information.

At block 606, the computing system determines whether validation has failed (or passed). For example, in one embodiment, the computing system may determine that validation has failed (or passed) when the depth metrics satisfy a predetermined condition(s). In one example, the computing system can determine a validation failure if at least one of the depth metrics for at least one of the distances does not satisfy a predetermined threshold. In one reference example, the computing system can determine a validation failure when the planar angle deviation at one of the distances is greater than a threshold (e.g., 3°) or the fill ratio for one of the distances is less than a threshold (e.g., 98%). Note, however, that these are merely reference examples and that the computing system may determine a validation failure (or validation success) based on another predetermined condition.

If the computing system determines that validation has failed, then the computing system provides an indication that the validation has failed (block 608). On the other hand, if the computing system determines that validation has passed, then the computing system provides an indication that the validation has passed (block 610). The method 600 may then exit.

Figure 7:
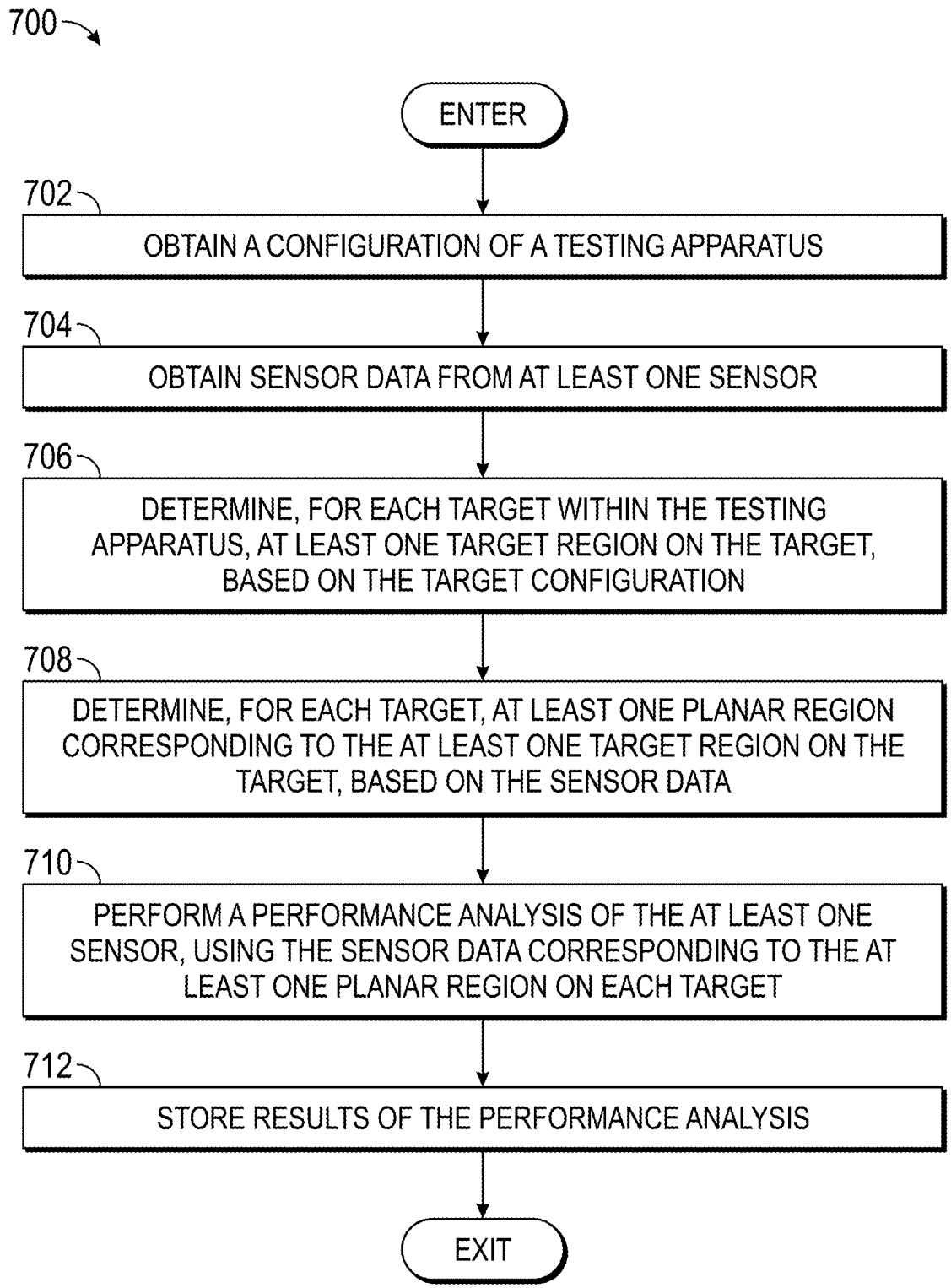
FIG. 7 is a flowchart of another method for evaluating and validating the performance of a sensor, according to one embodiment.

FIG. 7 is a flowchart of another method 700 for evaluating and validating the performance of a sensor 170, according to one embodiment. The method 700 may be performed by one or more components of a computing system (e.g., computing system 110). In one particular embodiment, the method 700 is performed by the evaluation component 130.

Method 700 enters at block 702, where the computing system obtains a configuration (e.g., target configuration 124) of a testing apparatus (e.g., testing apparatus 150). The configuration may indicate, for example, the size and dimensions of each target (e.g., target 160) within the testing apparatus, a type of pattern (if any) used for each target, the location and distance (from the testing position) at which each target is placed within the testing apparatus, etc.

Figure 8A:
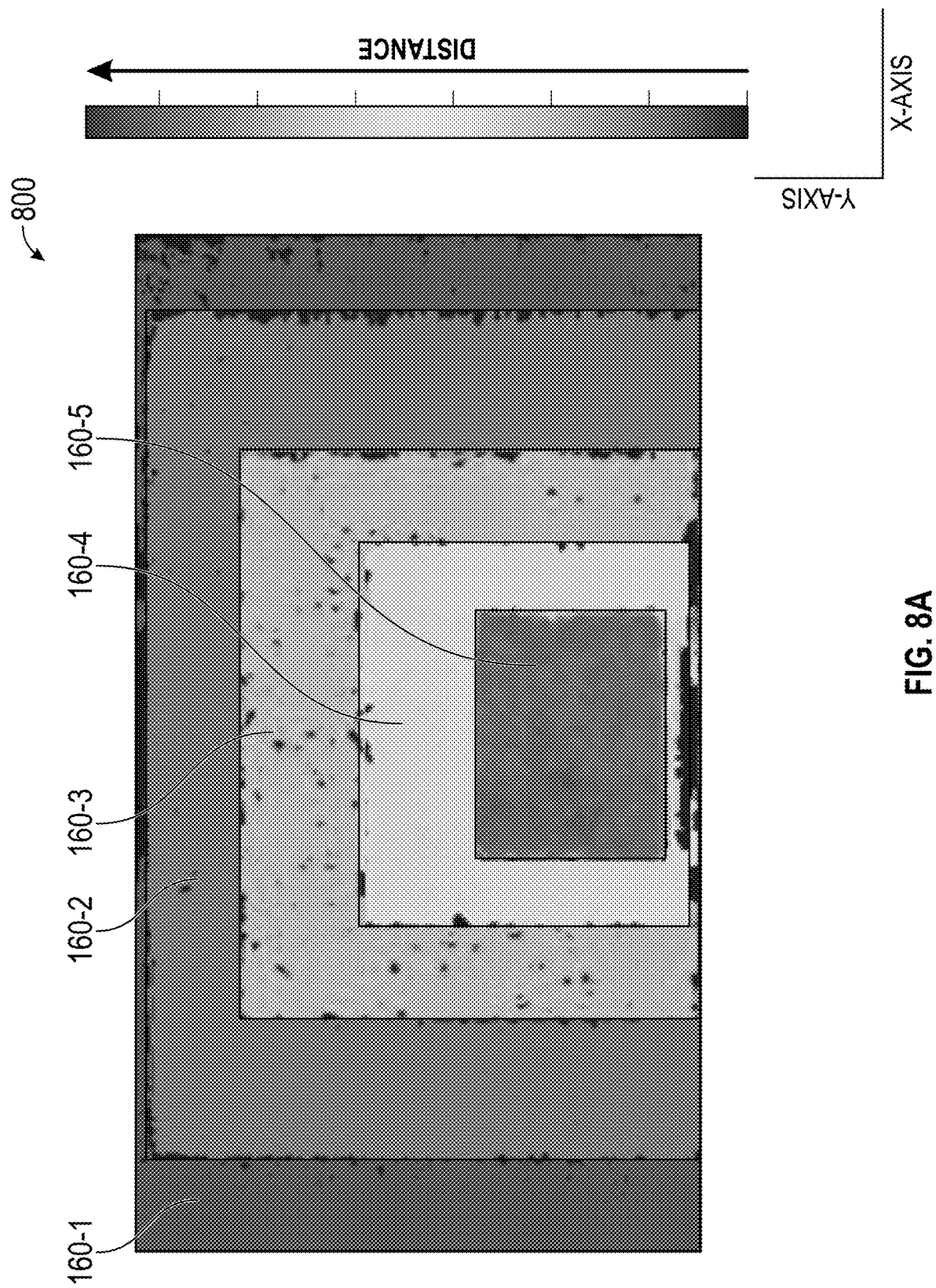
FIG. 8A illustrates a depth map for a sensor over multiple targets within a testing apparatus, according to one embodiment.

At block 704, the computing system obtains sensor data (e.g., sensor data 118) from at least one sensor (e.g., sensor 170). The sensor data can include information captured by the sensor regarding the targets within the testing apparatus. In one embodiment, the sensor data can include an image of the targets within the testing apparatus. The image, for example, can include at least a portion of each target within the testing apparatus. In one embodiment, the sensor data can include range information (e.g., point cloud data), indicating the depth (or distance) to various objects in the scene (e.g., the FOV of the sensor). FIG. 8A illustrates an example depth map 800 (indicating the depth to various objects in the scene) of the at least one sensor for the targets 160 1-5 illustrated in FIG. 2C.

At block 706, the computing system determines, for each target, at least one target region on the target, based on the target configuration. For example, the target configuration can indicate one or more target regions of interest to be used for performing a sensor performance test. In some cases, the target regions of interest may be based on values of the principle point offsets of the sensor. For each sensor, the target regions of interest may be adjusted based on the calibrated principle point offsets.

Figure 8B:
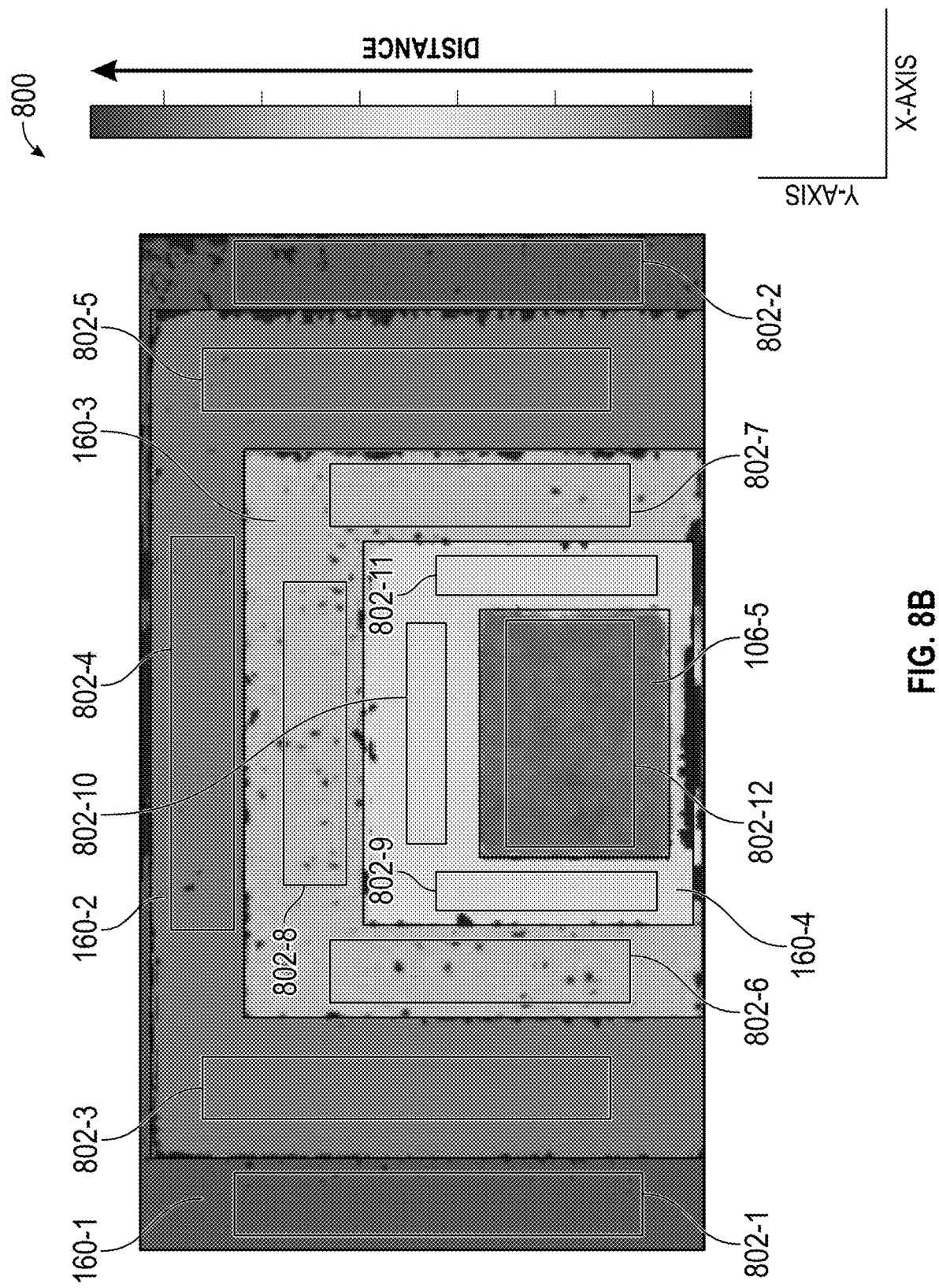
FIG. 8B illustrates an example of planar regions detected within the depth map in FIG. 8A, according to one embodiment.

At block 708, the computing system determines, for each target, at least one planar region corresponding to the at least one target region on the target, based on the sensor data. For example, the computing system can fit planes using detected points (from the sensor data) in each target region (specified in the target configuration). As shown in FIG. 8B, for example, the computing system can determine the planar regions 802 1-12, based on the information from the depth map 800. In FIG. 8B, the planar regions 802 1-2 are located within the target 160-1, the planar regions 802 3-5 are located within the target 160-2, the planar regions 802 6-8 are located within the target 160-3, the planar regions 802

9-11 are located within the target 160-4, and the planar region 802-12 is located on the target 160-5.

Figure 8C:
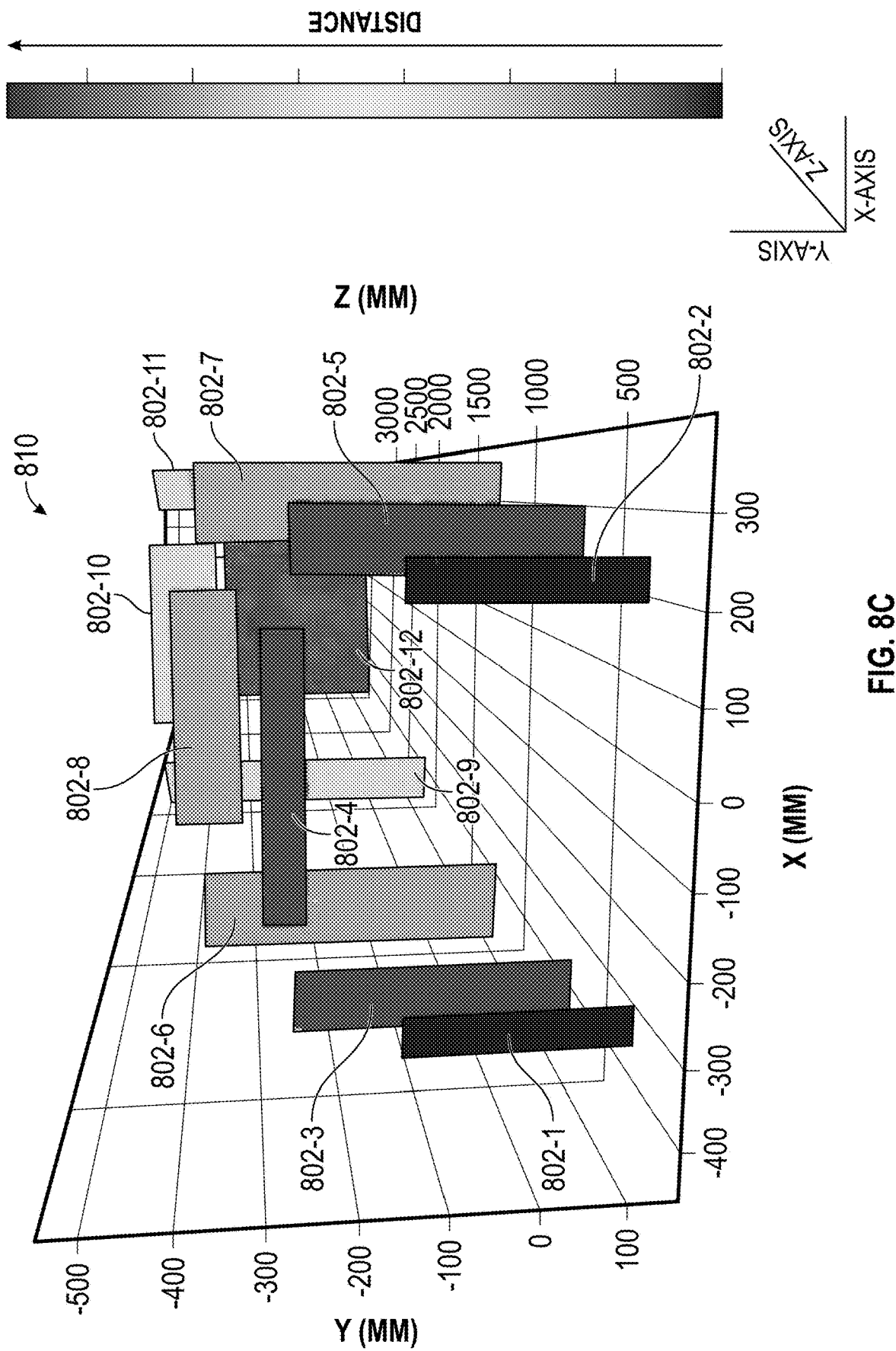
FIG. 8C illustrates a plot of data extracted from the planar regions illustrated in FIG. 8B, according to one embodiment.

At block 710, the computing system performs an analysis of the performance of the sensor, using the sensor data corresponding to the at least one planar region on each target. FIG. 8C shows 3D plot 810 of the sensor data extracted from each of the planar regions 802 1-12, based on the depth map 800. As noted above, the computing system can perform a statistical analysis on the planar regions to obtain one or more depth metrics, including for example, depth accuracy, fill ratio, planar angle deviations, standard deviation of a depth, etc. In one embodiment, for each planar region, the computing system can determine at least one of: (i) average X-Y angle of plane (deviating from "perfect-world" X-Y plane); (ii) average X-Z angle of plane (deviating from "perfect-world" X-Z plane); (iii) average fill ratio of region; (iv) average depth at region; (v) standard deviation of depth at region.

At block 712, the computing system stores the results of the performance analysis (e.g., in a storage system). In one embodiment, the results can be stored in various different formats, depending on the type of data. In one example, the computing system can generate a CSV file containing planar angles along with depth/min/max/mean/median/standard deviation for each target. In an example, the computing system can generate a CSV file that includes statistical analysis for each target. In an example, the computing system can generate a TXT file that includes the "Pass/Fail" results for each target. In an example, the computing system can generate a PNG file that displays the panel regions selected on a depth map. In an example, the computing system can generate a HTML file that includes interactive 3D plot showing a point cloud and planar fits. In an example, the computing system can generate a HTML file that includes interactive 3D plot displaying point cloud in selected panel regions. The method 700 may then exit.

Figure 9:
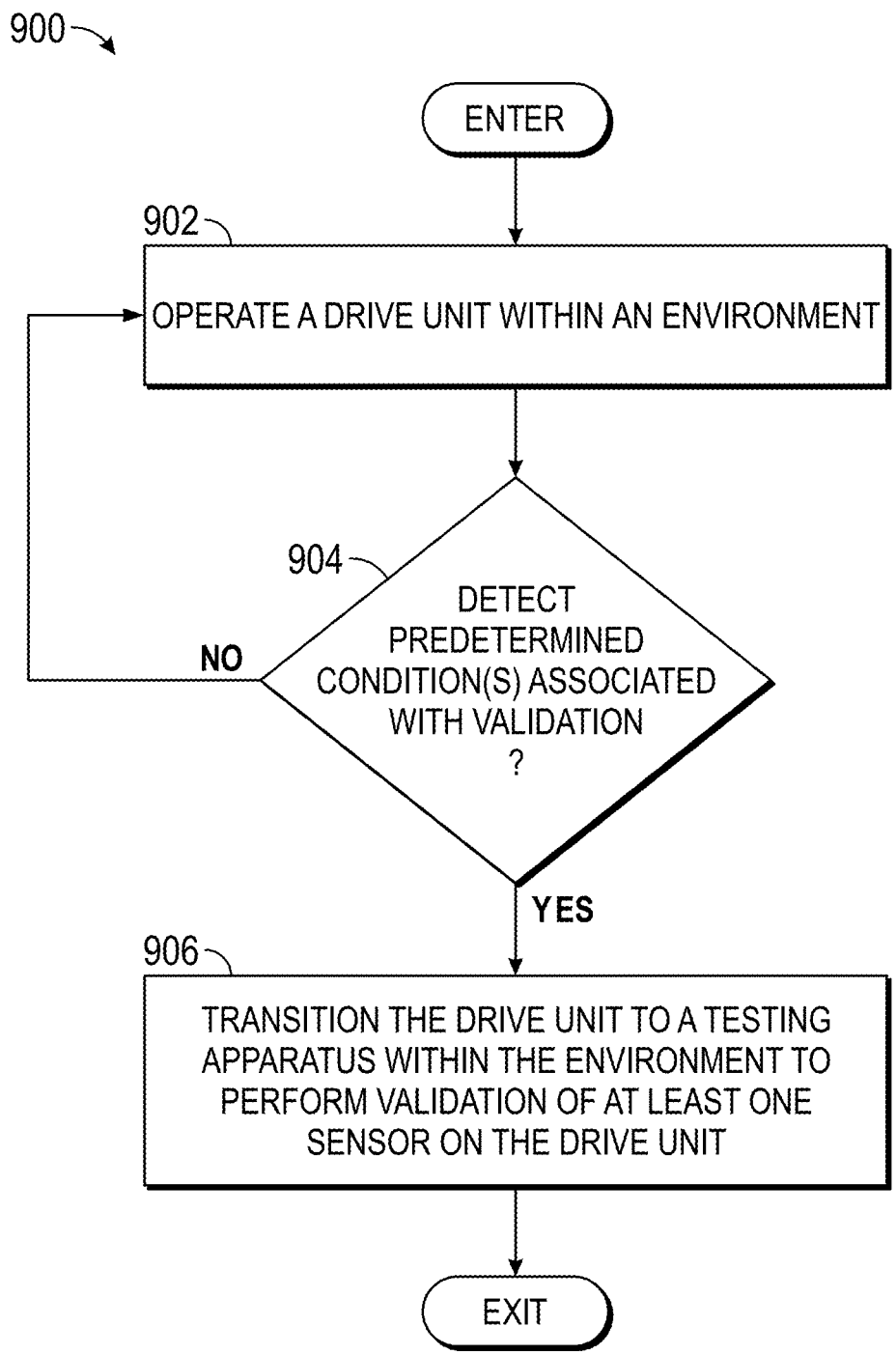
FIG. 9 is a flowchart of a method for controlling a drive unit, according to one embodiment.

FIG. 9 is a flowchart of a method 900 for controlling a drive unit (e.g., drive unit 120, drive unit 200, etc.) within an environment (e.g., environment 400), according to one embodiment. The method 900 may be performed by a computing system (e.g., computing system 110) or a drive unit (e.g., a controller of the drive unit).

Method 900 may enter at block 902, where the drive unit operates within the environment. For example, the drive unit may be used to transport items or objects across the environment. In one embodiment, the environment is a structured environment (e.g., structured field 410). In another embodiment, the environment is an unstructured environment.

At block 904, the drive unit determines whether one or more predetermined conditions associated with validation of the drive unit's sensors (e.g., sensor(s) 170) have been detected. As noted, the predetermined condition(s) can include at least one of a predetermined time instance (or time interval), an event, an instruction (or command), etc. In one particular embodiment, the predetermined condition includes an elapsed predefined amount of time since a previous (or prior) validation of the drive unit's sensors. If the predetermined condition(s) are not detected, then the method 900 proceeds to block 902.

On the other hand, if a predetermined condition(s) is detected at block 904, then the drive unit transitions to a testing apparatus (e.g., testing apparatus 150) within the environment to perform validation of at least one sensor on the drive unit. In one embodiment, the computing system may generate one or more commands to instruct the drive unit to transition (or move or approach) the testing apparatus. The method 900 may then exit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
    obtaining, via a depth sensor in a testing apparatus, range information of a scene within a field-of-view (FOV) of the depth sensor, the scene comprising a plurality of targets disposed within the testing apparatus, wherein each of the plurality of targets is located at a different distance from the depth sensor in the testing apparatus;
    determining, for validation of a performance of the depth sensor at each of the different distances, one or more metrics indicative of the performance of the depth sensor at the different distance, based on the range information; and
    providing an indication of a result of the validation.

2. The computer-implemented method of claim 1, wherein each of the plurality of targets comprises a textured pattern on a surface of the target.

3. The computer-implemented method of claim 2, wherein a size of the textured pattern on each of the plurality of targets is scaled with respect to the distance of the target from the depth sensor in the testing apparatus.

4. The computer-implemented method of claim 1, wherein the one or more metrics comprises at least one of: (i) a fill ratio, (ii) a depth accuracy, (iii) a planar angle deviation from a predefined planar angle, or (iv) a standard deviation of a depth value.

5. The computer-implemented method of claim 1, wherein providing the indication of the result of the validation comprises indicating that the validation has failed upon determining that at least one of the one or more metrics is below a respective threshold associated with the at least one of the one or more metrics.

6. The computer-implemented method of claim 1, further comprising:
   determining, for at least a first target of the plurality of targets, one or more planar regions of interest within the first target, based on the range information; and
   determining, for at least the first target, the one or more metrics indicative of the performance of the depth sensor at the distance associated with the first target, based on a subset of the range information from each of the one or more planar regions of interest.

7. The computer-implemented method of claim 1, wherein an entirety of the FOV of the depth sensor is filled with one or more portions from each of the plurality of targets.

8. The computer-implemented method of claim 7, wherein:
   the plurality of targets comprise a first target and a set of second targets;
   the distance between the first target and the depth sensor is a largest distance among the different distances;
   each of the set of second targets includes a cutout portion; and
   the first target is visible within the FOV of the depth sensor through each cutout portion.

9. The computer-implemented method of claim 1, wherein the plurality of targets comprises at least one of: (i) a first set of targets in a first plane, (ii) a second set of targets in a second plane, or (iii) a third set of targets in a third plane.

10. The computer-implemented method of claim 9, wherein:
    the first plane is an X-Y plane;
    the second plane is an X-Z plane; and
    the third plane is a Y-Z plane.

11. A testing apparatus comprising:
    a depth sensor disposed in a position at an end of the testing apparatus; and
    a plurality of targets, wherein:
      each target is located at a different distance away from the depth sensor;
      at least one portion of each of the plurality of targets is visible within a field-of-view (FOV) of the depth sensor; and
      an entirety of the FOV of the depth sensor is occluded by one or more portions of each of the plurality of targets;
    wherein:
      the plurality of targets comprise a first target and a set of second targets;
      the distance between the first target and the depth sensor is a largest distance among the different distances;
      each of the set of second targets includes a cutout portion; and
      the first target is visible within the FOV of the depth sensor through each cutout portion.

12. The testing apparatus of claim 11, wherein the first target is in a first plane, and (ii) the second target is in a second plane.

13. The testing apparatus of claim 12, wherein:
    the first plane is an X-Y plane; and
    the second plane is an X-Z plane.

14. A method comprising:
    obtaining, by one or more computer processors coupled to memory, and via a depth sensor in a testing apparatus, range information of a scene within a field-of-view (FOV) of the depth sensor, the scene comprising a plurality of targets disposed within the testing apparatus, wherein each of the plurality of targets is located at a different distance from the depth sensor in the testing apparatus, wherein an entirety of the FOV of the depth sensor is filled with one or more portions from each of the plurality of targets;
    performing, at a same point in time, a validation of a performance of the depth sensor at the different distances, based on the range information; and
    providing an indication of a result of the validation.

15. The method of claim 14, wherein each of the plurality of targets comprises a textured pattern on a surface of the target.

16. The method of claim 15, wherein a size of the textured pattern on each of the plurality of targets is scaled with respect to the distance of the target from the depth sensor in the testing apparatus.

17. The method of claim 14, wherein:
    the plurality of targets comprise a first target and a set of second targets;
    the distance between the first target and the depth sensor is a largest distance among the different distances;
    each of the set of second targets includes a cutout portion; and
    the first target is visible within the FOV of the depth sensor through each cutout portion.

18. The method of claim 14, wherein the plurality of targets comprises at least one of: (i) a first set of targets in a first plane, (ii) a second set of targets in a second plane, or (iii) a third set of targets in a third plane.

19. The method of claim 18, wherein:
    the first plane is an X-Y plane;
    the second plane is an X-Z plane; and
    the third plane is a Y-Z plane.

20. The method of claim 14, wherein performing the validation of the performance of the depth sensor comprises determining, for each of the different distances, one or more metrics indicative of the performance of the depth sensor at the different distance, based on the range information.

\* \* \* \* \*